United States Patent [19]
Baek et al.

[11] Patent Number: 5,786,869
[45] Date of Patent: Jul. 28, 1998

[54] AUTOMATIC CHANNEL SEARCHING METHOD FOR A TELEVISION RECEIVER

[75] Inventors: Woon Kil Baek; Han Sun Sung, both of Kyungsangbuk-Do, Rep. of Korea

[73] Assignee: LG Electronics Inc., Seoul, Rep. of Korea

[21] Appl. No.: 580,178

[22] Filed: Dec. 28, 1995

[30]   Foreign Application Priority Data

Dec. 28, 1994 [KR] Rep. of Korea ............... 1994 37801
Dec. 28, 1994 [KR] Rep. of Korea ............... 1994 37802

[51] Int. Cl.[6] .......................... H04N 5/445; H04N 5/50
[52] U.S. Cl. .................. 348/565; 348/564; 348/569; 348/570
[58] Field of Search ................... 348/565, 564, 348/569, 570, 563, 906, 974; H04N 5/445, 5/50

[56]   References Cited

U.S. PATENT DOCUMENTS

| | | | |
|---|---|---|---|
| 4,890,168 | 12/1989 | Inoue et al. | 348/565 |
| 5,161,019 | 11/1992 | Emanuel | 348/565 |
| 5,194,954 | 3/1993 | Duffield | 348/565 |
| 5,251,034 | 10/1993 | Na | 348/565 |
| 5,420,642 | 5/1995 | Baek | 348/565 |
| 5,432,561 | 7/1995 | Strubbe | 348/565 |

*Primary Examiner*—Mark R Powell
*Assistant Examiner*—Virek Srivastava
*Attorney, Agent, or Firm*—Fish & Richardson, P.C.

[57]   ABSTRACT

An automatic channel searching method for a picture-in-picture type television receiver which automatically searches other channel broadcasting signals and displays the searched channel broadcasting signal on a sub-channel region of a display screen when the present viewing channel program is almost completed or a new channel broadcasting program starts, thereby providing convenience for the user's channel selection. According to the channel searching method, broadcasting program information signal is detected from an input channel broadcasting signal, if it is determined according to the detected information signal whether or not a newly starting broadcasting program of a corresponding channel is displayed on the sub-channel region. Meanwhile, the end time of the present viewing broadcasting program may be determined according to the detected information signal, and other channel's broadcasting programs may be searched in turn and displayed on the sub-channel region before the end time of the present broadcasting program.

8 Claims, 7 Drawing Sheets

| PACKET | P-1 | P-2 | P-3 | P-5 | P-6 |
|---|---|---|---|---|---|
| FORMAT | START | PRESENT TIME DATA | | BROADCASTING STATION ID DATA | END |

FIG. 7B

| ITEM | PRESENT DATE/TIME DATA | | | | | | | BROADCASTING STATION ID DATA | | |
|---|---|---|---|---|---|---|---|---|---|---|
| | YY | MM | DD | H | M | S | LV1 | RSD | LOCAL-ID | MAIN-ID | SUB-ID |
| NO. OF BITS | 7 | 4 | 5 | 5 | 6 | 6 | 2 | 7 | 1 | 8 | 5 |
| | 33 BITS | | | | | | | :2BITS; 7 BITS | 14 BITS | | |

FIG. 7C

| PACKET | P-1 | P-2 | P-3 | P-4 | P-5 | P-6~19 | P-20 |
|---|---|---|---|---|---|---|---|
| FORMAT | START | PROGRAM ID DATA | START TIME DATA | DISP. DATA | OTHER CODES | TITLE | END |

FIG. 7D

| ITEM | PROGRAM ID DATA | | | START TIME DATA | | | DISP. DATA | | | OTHER CODES | | | | | | TITLE |
|---|---|---|---|---|---|---|---|---|---|---|---|---|---|---|---|---|
| | TLEN | RSO | TITLE/DISP. DATA POINT | H | M | M | H | M | M | TYPE | LOW | CAP | S-M | SORT | | |
| NO. OF BITS | 4 | 2 | 8 | 5 | 6 | 6 | 5 | 6 | 6 | 1 | 7 | 1 | 3 | 8 | | 14 CH'TER |
| | 14 BITS | | | 11 BITS | | | 11 BITS | | | 20 BITS | | | | | | 28 BYTES |

AUTOMATIC CHANNEL SEARCHING METHOD FOR A TELEVISION RECEIVER

BACKGROUND OF THE INVENTION

1. Field of the Invention

The present invention relates to an automatic channel searching method for a television receiver. More particularly, the present invention relates to an automatic channel searching method for a picture-in-picture type television receiver which automatically searches other channel broadcasting signals and displays the searched channel broadcasting signal on a sub-channel region of a display screen when the present viewing channel program is almost completed or a new channel program starts, thereby providing convenience for the user's channel selection.

2. Description of the Prior Art

Figure 1:
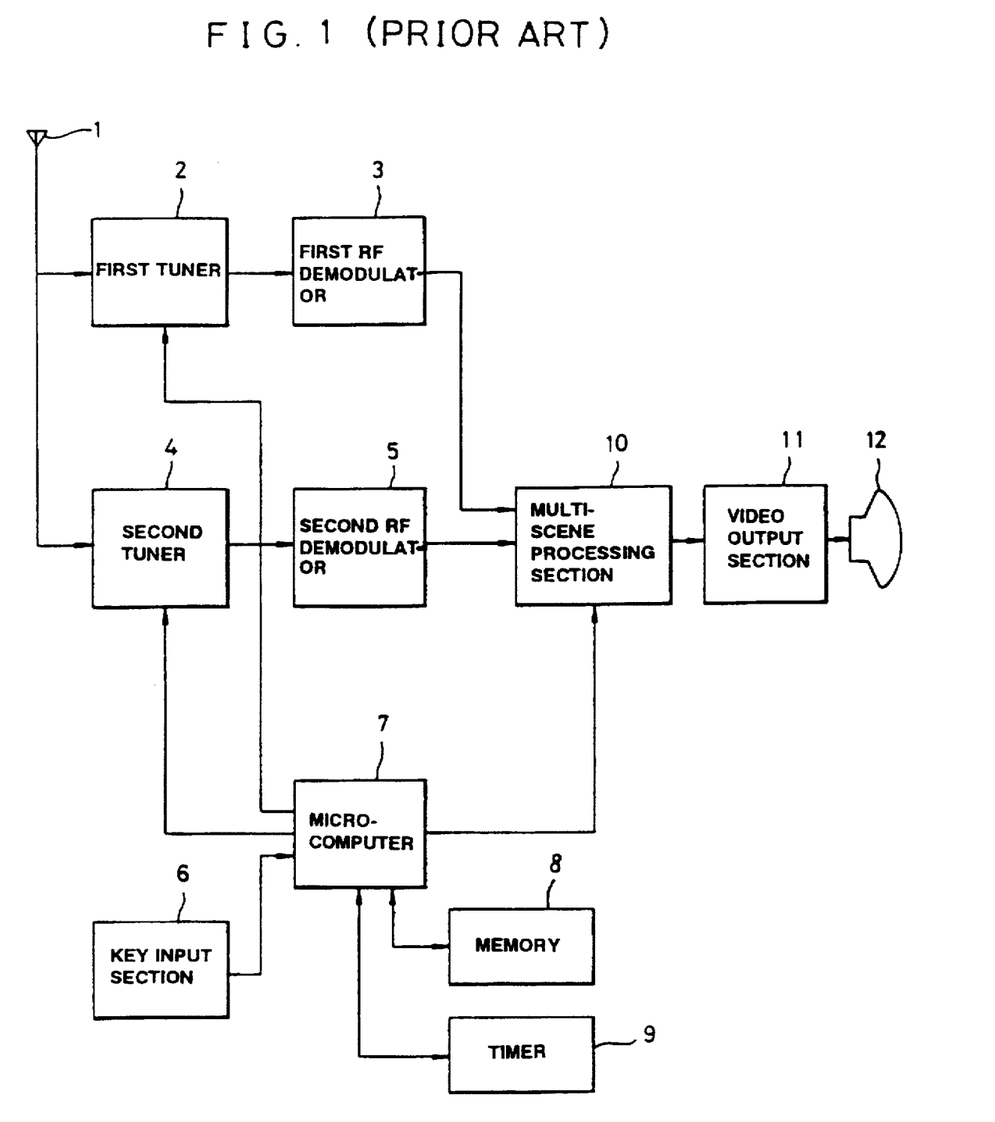
FIG. 1 is a schematic block diagram of a conventional apparatus for implementing a conventional channel searching method for a television receiver.

FIG. 1 is a block diagram of a conventional apparatus for implementing a conventional channel searching method for a television receiver. Referring to FIG. 1, the conventional apparatus includes a first tuner 2 for selecting a main-channel broadcasting signal among broadcasting channel signals received through an antenna 1, a first radio frequency (RF) demodulator 3 for demodulating the RF channel broadcasting signal selected by the first tuner 2, a second tuner 4 for selecting a sub-channel broadcasting signal among the broadcasting channel signals received through the antenna 1, and a second RF demodulator 5 for demodulating the RF channel broadcasting signal selected by the second tuner 4. The conventional apparatus also includes a key input section 6 for inputting functional key signals, a microcomputer 7 for controlling the operation of each section of the apparatus in accordance with the key signals inputted through the key input section 6, a memory 8 for storing data processed by the microcomputer 7, a timer 9 for providing time data to the microcomputer 7, a multi-scene processing section 10 for receiving and multi-scene-processing outputs of the first and second RF demodulators 3 and 5, and a video output section 11 for outputting a video signal processed by the multi-scene processing section 10 to a cathode-ray tube (CRT) 12.

Figure 2:
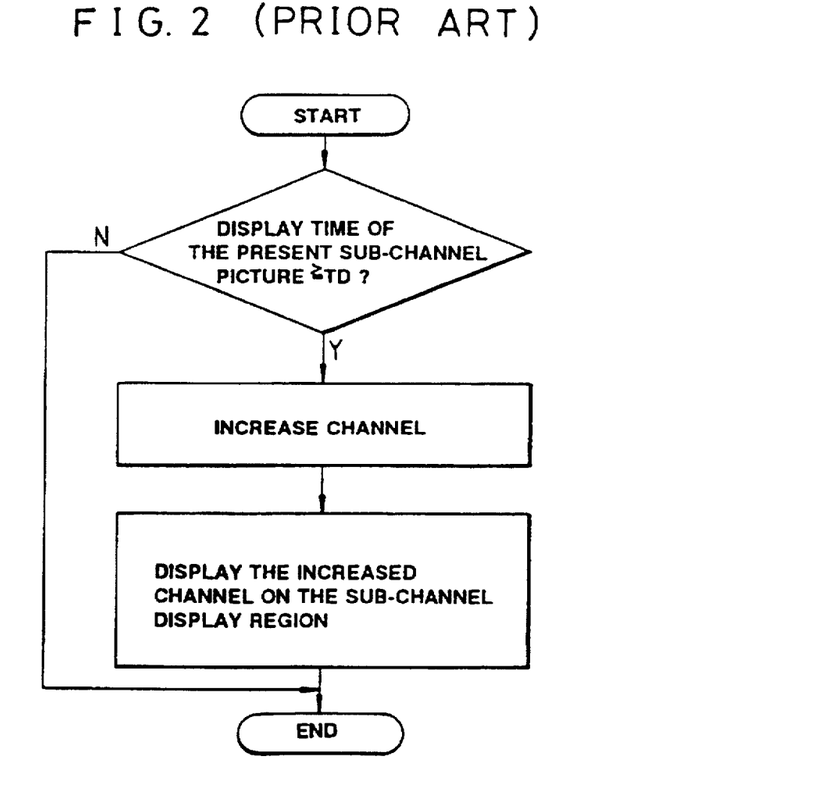
FIG. 2 is a flowchart incorporating a conventional channel searching method for a television receiver.

FIG. 2 is a flowchart incorporating a conventional channel searching method for a television receiver. Referring to FIG. 2, the conventional method comprises the steps of determining whether or not a predetermined time has passed after display of a present sub-channel picture, increasing the channel of the sub-channel picture if it is determined that the predetermined time has passed, and displaying the increased channel broadcasting signal on a sub-channel region of the display screen.

Referring to FIGS. 1 and 2, the microcomputer 7 controls the first tuner 2 to select a main-channel broadcasting signal among the broadcasting channel signals received through the antenna 1 in accordance with a key signal inputted from the key input section 6. The main-channel broadcasting signal selected by the first tuner 2 is RF-demodulated by the first RF demodulator 3, and the demodulated main-channel broadcasting signal is inputted to the multi-scene processing section 10.

Meanwhile, the second tuner 4 selects a sub-channel broadcasting signal among the broadcasting channel signals received from the antenna 1 under the control of the microcomputer 7. The sub-channel broadcasting signal selected by the second tuner 4 is RF-demodulated by the second RF demodulator 5, and the demodulated sub-channel broadcasting signal is inputted to the multi-scene processing section 10. The microcomputer 7 controls the multi-scene processing section 10 so that the multi-scene processing section 10 performs multi-scene-processing with respect to the main-channel and the sub-channel broadcasting signals outputted from the RF demodulators 3 and 5. The multi-scene-processed video signal from the multi-scene processing section 10 is converted into a signal to be displayed on the CRT 12 by the video output section 11, so that the main-channel picture in which the sub-channel picture is superimposed is displayed on the CRT 12.

According to the conventional channel searching method, the multi-scene processing section 10 processes the sub-channel picture signal selected by the second tuner 4 and enable the sub-channel picture to be displayed on the sub-channel region of the CRT 12 screen for a predetermined time under the control of the microcomputer 7. When the predetermined time has passed after display of the sub-channel picture, the microcomputer 7 increases the channel of the sub-channel picture, and then controls the second tuner 4 to select the increased sub-channel broadcasting signal to display the increased sub-channel picture on the sub-channel region of the CRT 12 screen.

However, the conventional channel searching method as described above has the drawback in that a user cannot recognize a newly-starting broadcasting program while watching the television since according to the conventional method, a sub-channel picture is displayed on the sub-channel display region for a predetermined time regardless of its broadcasting program, and after the predetermined time passes, the channel of the sub-channel picture is increased and the increased sub-channel signal is displayed on the sub-channel region of the CRT screen.

Meanwhile, another conventional channel searching method performed by the apparatus of FIG. 1 is disclosed. According to this method, a user can select a channel searching mode by means of the key input section 6 when the main-channel picture is displayed on the CRT 12. At this time, the microcomputer 7 operates the second tuner 4 so that it selects channels stored in the memory 8 one by one and displays the selected channel broadcasting signal on the sub-channel region of the CRT 12 screen. Specifically, the microcomputer 7 controls the second tuner 4 to primarily select the same channel signal as the main-channel signal, and displays the channel signal on the sub-channel region of the CRT screen. After the selected channel signal is displayed for a predetermined time, the microcomputer 7 controls the second tuner to select a next channel signal, and displays the next channel signal on the sub-channel region of the CRT, enabling the user to select a desired channel signal.

Figure 8:
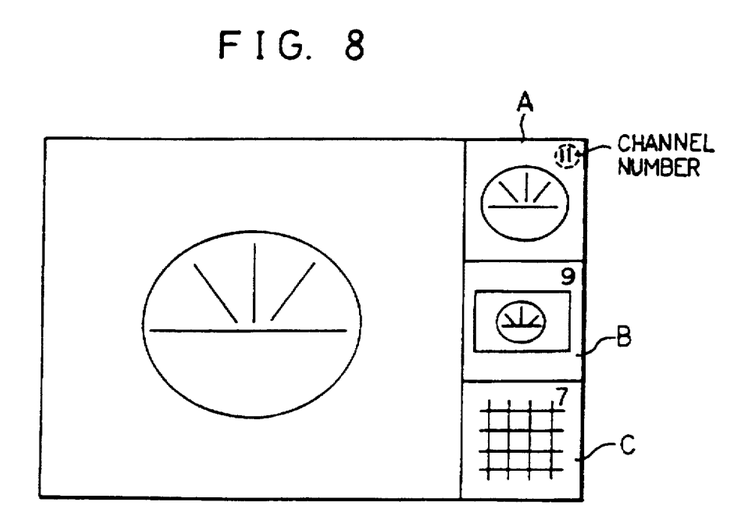
FIG. 8 is a view showing the display state of a display screen during a channel searching mode.

FIG. 8 is a view showing the display state of the CRT screen during the channel searching mode as described above. Referring to FIG. 8, three sub-channel regions are provided within the main-channel region. When the channel searching mode is selected, a primarily selected channel signal is displayed on the first sub-channel region A as a moving picture, while a still picture is displayed on each of the second and third sub-channel regions B and C. Thereafter, another selected channel signal is displayed on the second sub-channel region B, and then another selected channel signal is displayed on the third sub-channel region C, resulting in three different selected channel signals displayed on the first to third sub-channel regions, respectively.

However, the conventional channel searching method as described above has the disadvantage of causing inconvenience to a user such that he or she must enter separate keys to search separate channel signals.

SUMMARY OF THE INVENTION

The present invention has been made to solve the problems involved in the prior art. It is an object of the present invention to provide an automatic channel searching method for a television receiver which can automatically search a channel in which a new program starts by utilizing broadcasting program information included in a received channel broadcasting signal and display the searched channel broadcasting signal on a sub-channel region of a display screen, thereby providing convenience for the user's channel selection.

It is another object of the present invention to provide an automatic channel searching method for a television receiver which can automatically search other channel broadcasting signals in turn and display the searched channel broadcasting signal on a sub-channel region of a display screen by indicating its channel number in a predetermined time before the present channel program is displayed on a main-channel region of the display screen or in a predetermined time before the following channel program starts utilizing broadcasting program information included in the received channel broadcasting signal, thereby providing convenience for the user's channel selection.

In one aspect of the present invention, there is provided an automatic channel searching method for a picture-in-picture type television receiver, which comprises the steps of:

detecting broadcasting program information signal from an input channel broadcasting signal;

determining whether or not a newly starting broadcasting program exists in accordance with the detected broadcasting program information signal; and displaying the broadcasting program of a corresponding channel on a sub-channel region of a display screen if it is determined that the newly starting broadcasting program exists.

In another aspect of the present invention, there is provided an automatic channel searching method for a picture-in-picture type television receiver, which comprises the steps of:

detecting broadcasting program information from an input channel broadcasting signal, and identifying the present time and an end time of the present broadcasting program displayed on a main-channel region of a display screen;

determining whether or not the identified present time reaches in a predetermined time before the present broadcasting program is completed; and searching other channel broadcasting signals in turn and displaying the searched channel broadcasting signal on a sub-channel region of the display region if it is determined that the present time reaches in the predetermined time.

BRIEF DESCRIPTION OF THE DRAWINGS

The above objects and other features of the present invention will become more apparent by describing the preferred embodiments thereof with reference to the accompanying drawings, in which.

DETAILED DESCRIPTION OF THE PREFERRED EMBODIMENTS

Figure 3:
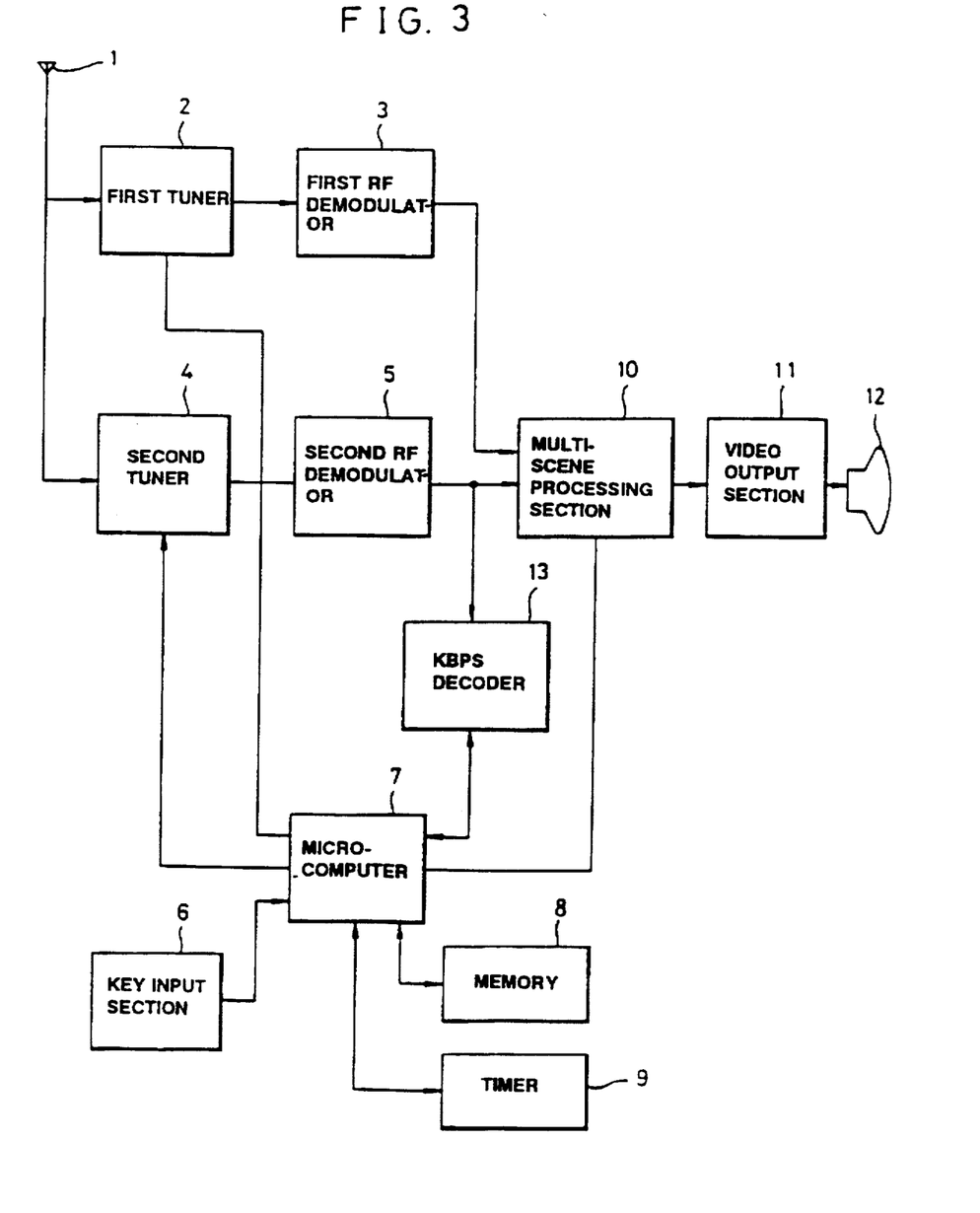
FIG. 3 is a schematic block diagram of an apparatus for implementing the automatic channel searching method for a television receiver according to one embodiment of the present invention.

FIG. 3 is a schematic block diagram of an apparatus for implementing the automatic channel searching method according to one embodiment of the present invention. Referring to FIG. 3, the present apparatus includes a first tuner 2 for selecting a main-channel broadcasting signal among broadcasting channel signals received through an antenna 1, a first RF demodulator 3 for RF-demodulating the channel broadcasting signal selected by the first tuner 2, a second tuner 4 for selecting a sub-channel broadcasting signal among the broadcasting channel signals received through the antenna 1, a second RF demodulator 5 for RF-demodulating the channel broadcasting signal selected by the second tuner 4, and Korean Broadcasting Program System (KBPS) decoder 13 for detecting a KBPS signal from the output of the second RF demodulator 5 and decoding the KBPS data to provide broadcasting program information data.

The present apparatus also includes a key input section 6 for inputting functional key signals, a microcomputer 7 for controlling the operation of each section of the apparatus in accordance with the key signals inputted through the key input section 6, the microcomputer 7 receiving the broadcasting program information data from the KBPS decoder 13, a memory 8 for storing data which are processed in the microcomputer 7, a timer 9 for providing time data to the microcomputer 7, a multi-scene processing section 10 for receiving and multi-scene-processing the outputs of the first and second RF demodulators 3 and 5, and a video output section 11 for outputting to a CRT 12 a video signal processed by means of the multi-scene processing section 10.

Figure 4:
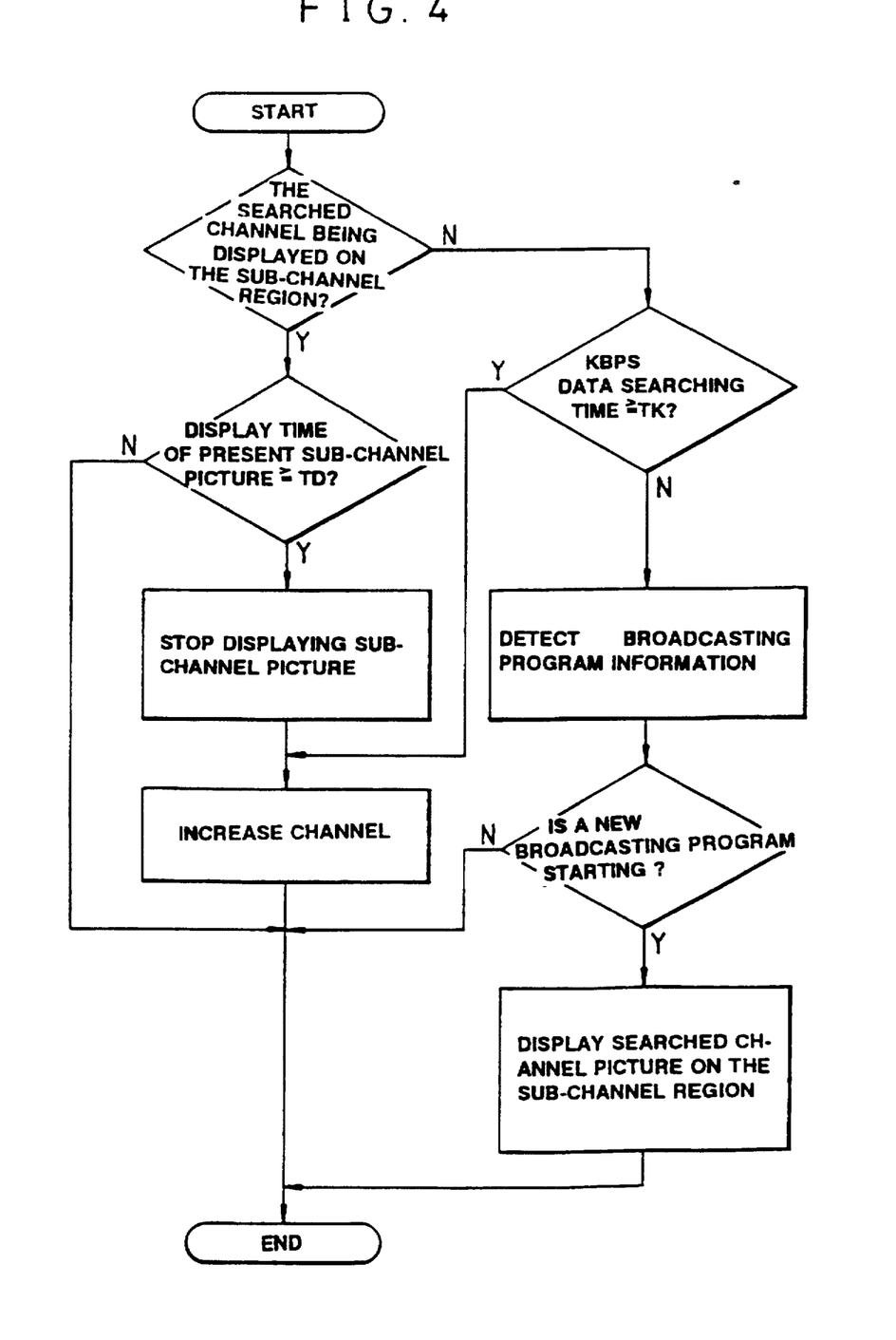
FIG. 4 is a flowchart incorporating the automatic channel searching method for a television receiver according to one embodiment of the present invention.

FIG. 4 is a flowchart incorporating the automatic channel searching method for a television receiver according to one embodiment of the present invention. Referring to FIG. 4, the present automatic channel searching method comprises the steps of: 1) determining whether or not a searched channel is being displayed on the sub-channel region of the CRT screen; 2) determining whether or not the display time of the searched channel has passed beyond a predetermined time TD if it is determined that the searched channel is displayed at step 1); 3) increasing the channel of the sub-channel region if it is determined that the display time has passed beyond the predetermined time TD at step 2); 4)

determining whether or not the KBPS data searching time has passed beyond a predetermined time TK if it is determined that the searched channel is not displayed at step 1); 5) determining that a newly starting broadcasting program is not searched if it is determined that the KBPS data searching time has passed beyond the predetermined time TK at step 4), and increasing the channel of the sub-channel broadcasting signal; 6) determining whether or not a newly starting program exists by detecting the broadcasting program data if it is determined that the KBPS data searching time have not passed beyond the predetermined time TK at step 4); and 7) displaying a newly searched channel signal on the sub-channel region if it is determined that the newly starting program exists at step 6).

The microcomputer 7 controls the first tuner 2 to select a main-channel broadcasting signal among the broadcasting channel signals received through the antenna 1 in accordance with a channel selection key signal inputted through the key input section 6. The second tuner 4 selects a sub-channel broadcasting signal to be displayed on the sub-channel region of the CRT 12 screen under the control of the microcomputer 7.

The main-channel and the sub-channel broadcasting signals selected by the respective tuners 2 and 4 are RF-demodulated by the first and second RF demodulators 3 and 5, and the demodulated signals are inputted to the multi-scene processing section 10. The multi-scene processing section 10 performs multi-scene-processing with respect to the received channel signals under the control of the microcomputer 7, and the video signal multi-scene-processed by the multi-scene processing section 10 is then displayed on the CRT 12 through the video output section 11.

At the same time, the KBPS decoder 13 detects the KBPS data included in the video signal which is outputted from the second RF demodulator 5 to the multi-scene processing section 10, and decodes the KBPS data to provide the decoded KBPS data, i.e., the broadcasting program information data, to the microcomputer 7.

The KBPS data, which are transmitted from a broadcasting station, are included in the 16th line of the 21-line vertical blanking intervals. The KBPS data are composed of broadcasting station standard time information, the current viewing program information, broadcasting station identification, weekly program information (a quantity for one to four weeks), data classified by program types, a program sub-title, program deletion information, etc. The KBPS data are repeatedly transmitted for a predetermined time period. In the KBPS data, data of 2 bytes are decoded in one line, and several decoded data constitute a packet. The KBPS data are composed of 10 kinds of packet, and two kinds of the packet are illustrated in FIGS. 7A to 7D.

Figure 7A:
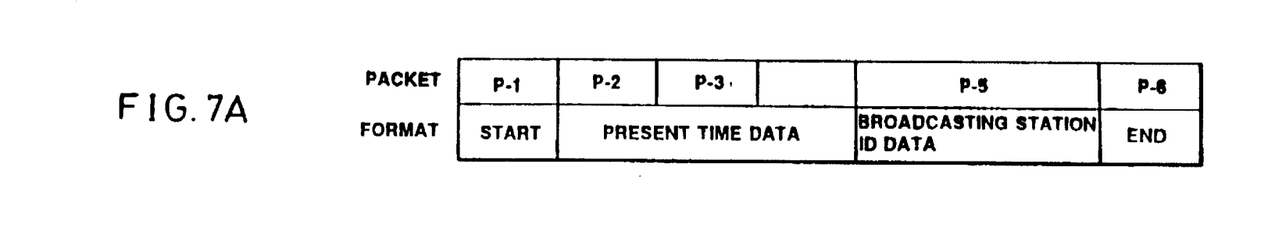
FIG. 7A is a diagram illustrating the format of a KBPS data packet 1 identifying the present time.
Figures 7B, 7C:
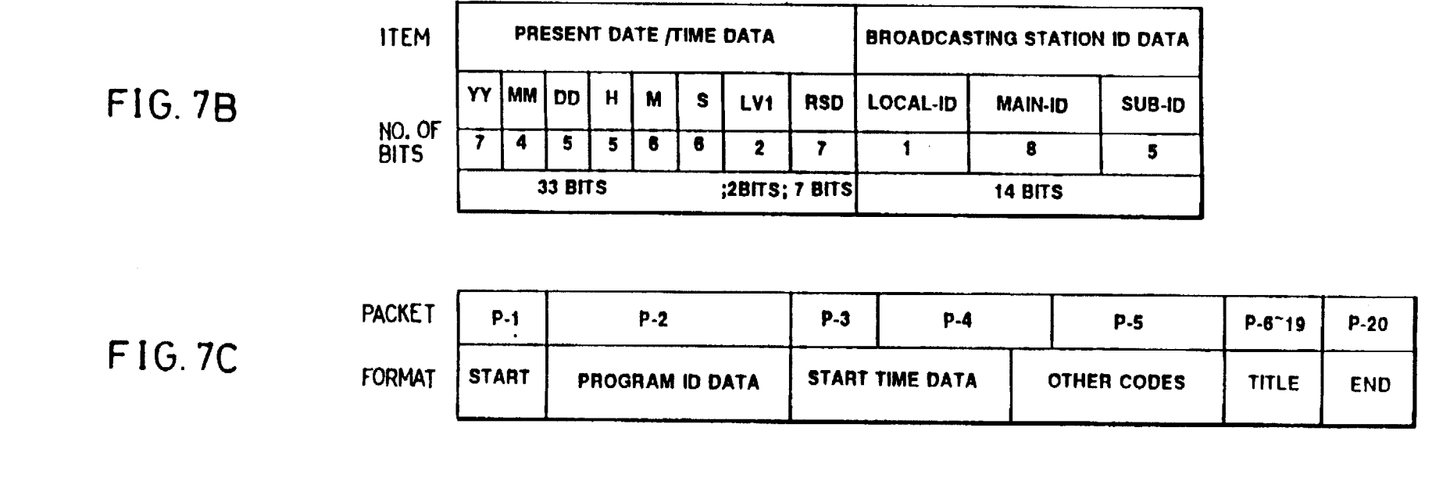
FIG. 7B is a diagram illustrating the detailed data format of the present time and a broadcasting station in the data packet 1 of FIG. 7A.
FIG. 7C is a diagram illustrating the format of a KBPS data packet 7 identifying the program starting time.

FIGS. 7A and 7B are diagrams illustrating the data format of a KBPS data packet 1 identifying the present time. In FIG. 7A, P-1 and P-6 represent the start and end of the data packet, P-2, P-3, and P-4 represent the present time, and P-5 represents the broadcasting station identification. FIG. 7B shows the detailed format of the present time data and the broadcasting station identification data by bits.

Figure 7D:
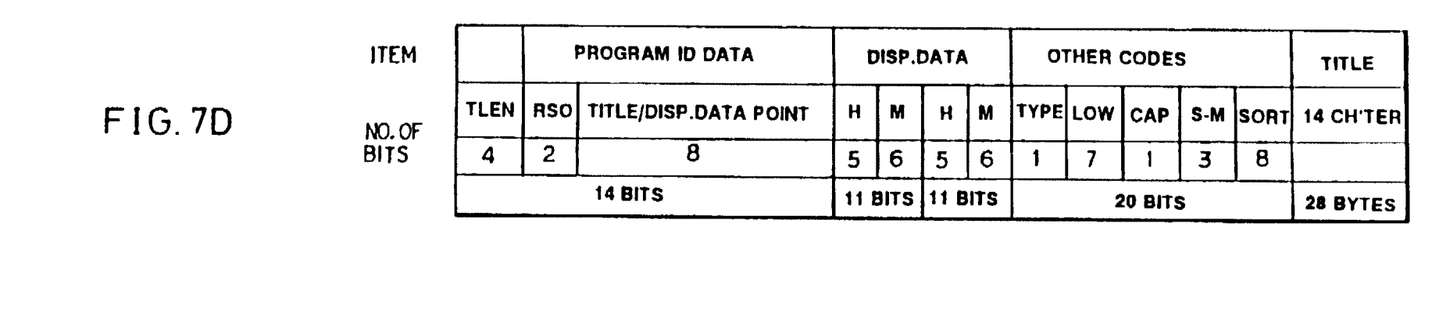
FIG. 7D is a diagram illustrating the detailed data format by bits of a program identification number and the title of a program in the data packet 7 of FIG. 7C.

FIGS. 7C and 7D are diagrams illustrating the data format of a KBPS data packet 7 identifying the program starting time. In FIG. 7C, P-1 and P-20 represent the start and end of the data packet, P-2 represent the program identification number, and P-3 and P-4 represent the start time of the program broadcasting. FIG. 7D shows the detailed data format by bits of the program identification number and the title of the program in the data packet 7 of FIG. 7C.

In the assumption that the identification number of the present broadcasting program is 5 and the start and end time thereof are ten o'clock and ten thirty, respectively, the identification number of a following broadcasting program will be 6 and the start time thereof will be ten thirty.

The microcomputer 7 controls the display of a searched channel broadcasting signal on the sub-channel region of the CRT 12 according to the KBPS data inputted thereto. Specifically, if the searched channel signal is displayed on the sub-channel region, the microcomputer 7 determines whether the display time of the searched channel signal has passed beyond the predetermined time. If so, the microcomputer 7 stops the sub-channel picture display and increases the channel of the sub-channel picture. If it is determined that the searched channel signal is not displayed on the sub-channel region, the microcomputer 7 determines whether or not the predetermined time TK has passed while the searched channel signal is not displayed on the sub-channel region.

If it is determined that the searched channel signal is not displayed for the predetermined time TK, the microcomputer 7 determines that no new broadcasting program starts, and increases the channel of the sub-channel broadcasting signal.

Meanwhile, if it is determined that the predetermined time TK has not passed while the searched channel signal is not displayed on the sub-channel region, the microcomputer determines whether or not a newly starting broadcasting program exists. If so, the searched channel broadcasting signal is displayed on the sub-channel region under the control of the microcomputer 7.

If the searched channel broadcasting signal is not displayed on the sub-channel region, the microcomputer 7 determines the KBPS data searching time and controls the channel searching operation. At this time, if the KBPS data searching time has not passed beyond the predetermined time TK, the microcomputer identifies the broadcasting program information from the KBPS data to detect if a newly starting broadcasting program exists. If so, the microcomputer 7 controls the second tuner 4 and the multi-scene processing section 10, so that a newly starting broadcasting program is displayed on the sub-channel region.

Figure 5:
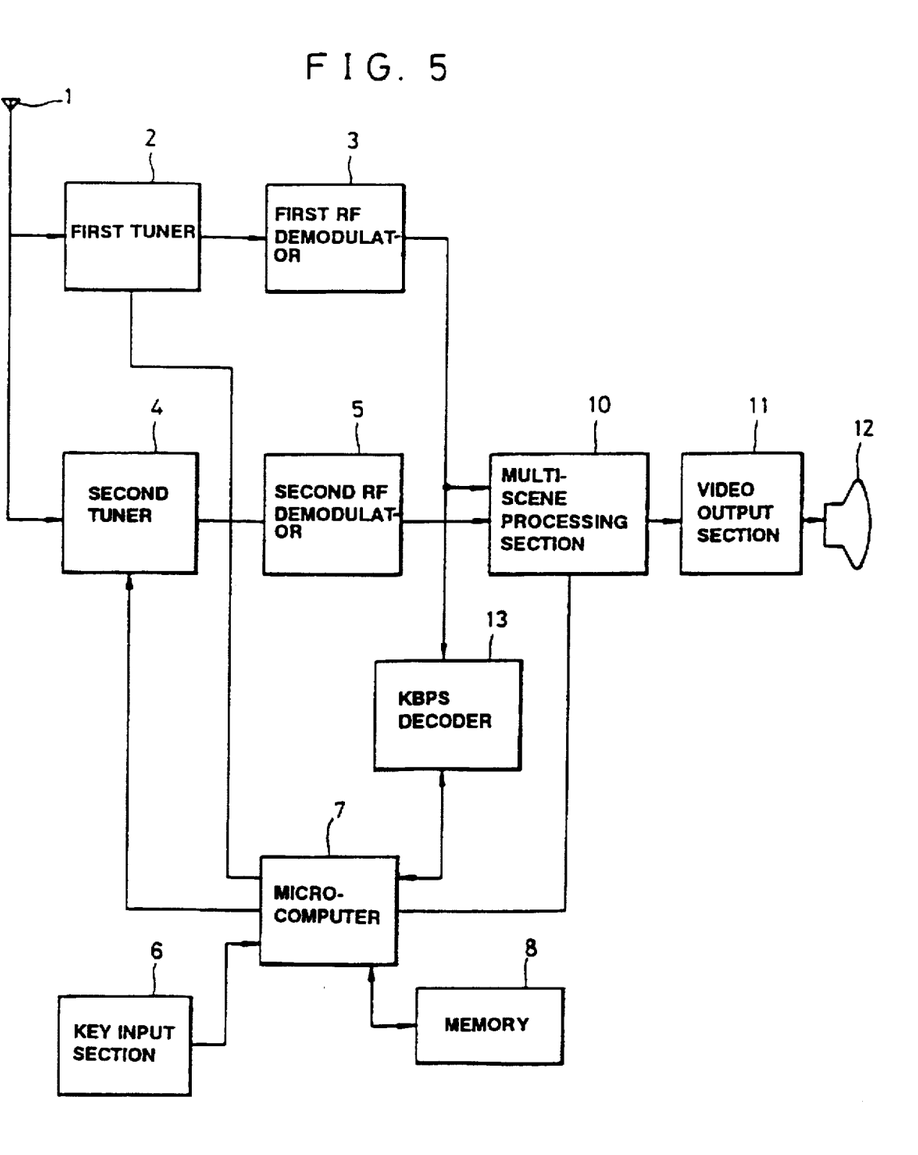
FIG. 5 is a schematic block diagram of another apparatus for implementing the automatic channel searching method for a television receiver according to another embodiment of the present invention.

FIG. 5 is a schematic block diagram of another apparatus for implementing the automatic channel searching method according to another embodiment of the present invention. The apparatus of FIG. 5 has the same construction as the apparatus of FIG. 4 except that the KBPS decoder 13 for decoding the KBPS data included in the video signal is connected to the output terminal of the first RF demodulator 3 for RF-demodulating the main-channel broadcasting signal selected by the first tuner 2.

Figure 6:
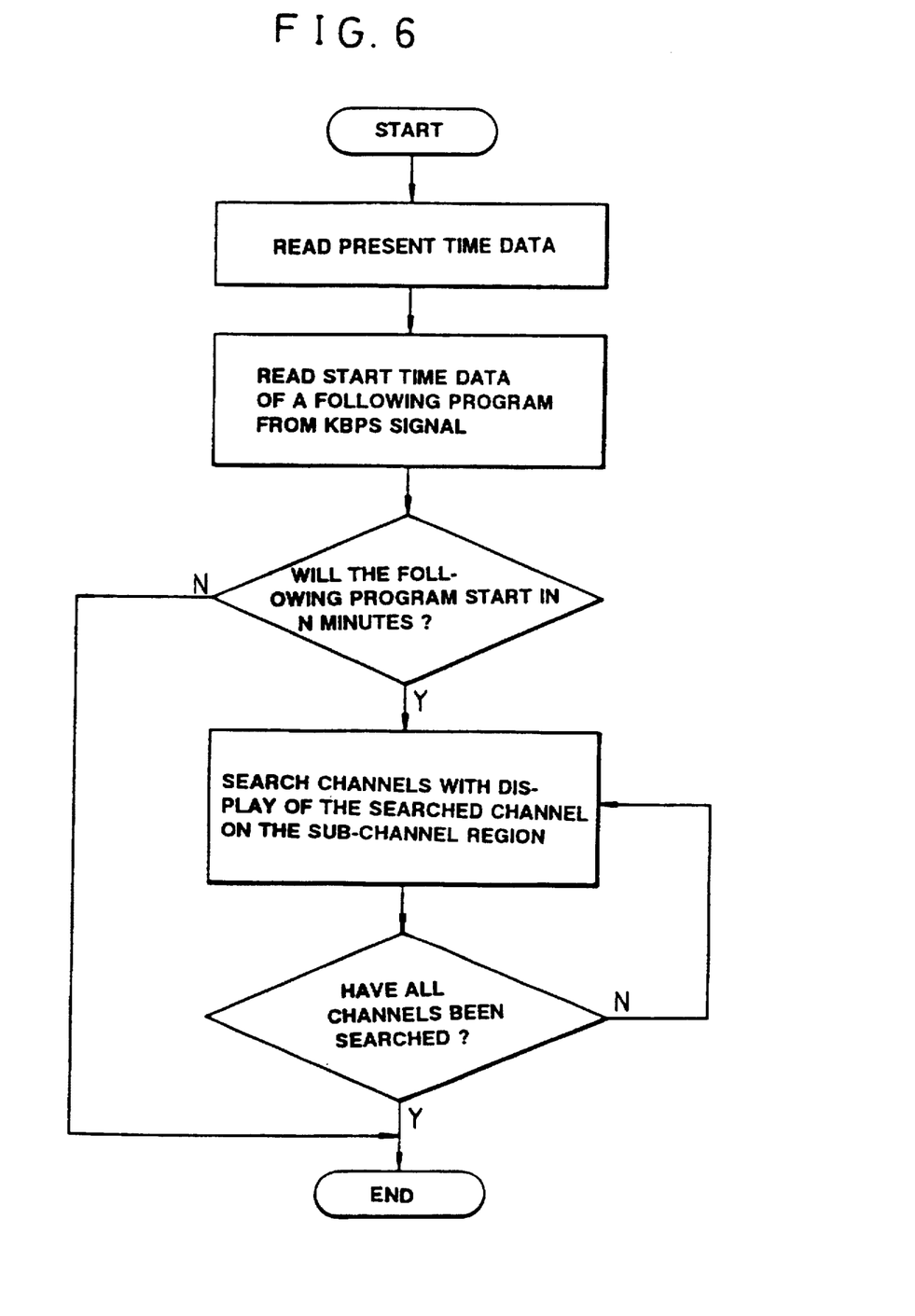
FIG. 6 is a flowchart incorporating the automatic channel searching method for a television receiver according to another embodiment of the present invention.

FIG. 6 is a flowchart incorporating the automatic channel searching method according to another embodiment of the present invention. Referring to FIG. 6, the present method comprises the steps of: 1) reading the present time data decoded by the KBPS decoder 13 and reading the start time data of a following broadcasting program of the present channel; 2) determining whether or not the present time reaches in a predetermined time N before the start of the following broadcasting program; and 3) stopping search operation if it is determined that the present time does not reach in the predetermined time N, and searching other channel broadcasting signal one by one by operating the second tuner 4 if it is determined that the present time reaches in the predetermined time N.

Referring to FIGS. 5 and 6, the microcomputer 7 controls the first tuner 2 to select a main-channel broadcasting signal among the broadcasting channel signals received through the antenna 1 in accordance with the key signal inputted through the key input section 6. The channel broadcasting signal selected by the tuner 2 is RF-demodulated by the first RF demodulator 3, and the demodulated channel broadcasting signal is inputted to the multi-scene processing section 10. The video signal multi-scene-processed by the multi-scene processing section 10 is then displayed on the CRT 12 through the video output section 11.

As the main-channel broadcasting signal is displayed on the CRT 12 as described above, the microcomputer 7 identifies the present time by the output of the KBPS decoder 13 for decoding the KBPS signal included in the video signal outputted from the first RF demodulator 3. Then the microcomputer 7 determines whether or not the identified present time reaches in the predetermined time N before a following broadcasting program starts. If so, the microcomputer 7 operates the second tuner 4 to select all channel broadcasting signals received one by one and display the selected channel broadcasting signal on the sub-channel region of the CRT 12. In other words, the microcomputer 7 automatically performs a channel search and displays the searched channel broadcasting signal on the sub-channel region of the CRT 12 in five minutes before the present broadcasting program is completed.

From the foregoing, it will be apparent that the present invention has the advantage that it provides convenience for the user's channel selection, since, according to the present invention, other channel's broadcasting program information is identified utilizing the KBPS data, automatic channel search is performed, and the searched channel broadcasting signal is displayed on the sub-channel region of the CRT if a new broadcasting program starts in a predetermined time, or the present channel program displayed on the main-channel region will be completed in a predetermined time.

While the present invention has been described and illustrated herein with reference to the preferred embodiments thereof, it will be understood by those skilled in the art that various changes in form and details may be made therein without departing from the spirit and scope of the invention.

What is claimed is:

1. An automatic channel searching method for a picture-in-picture type television receiver, comprising the steps of:
   detecting broadcasting program information from an input channel broadcasting signal;
   determining from the detected broadcasting program information whether or not a newly starting broadcasting program exists; and
   displaying the broadcasting program of a corresponding channel on a sub-channel region of a display screen if it is determined that the newly starting broadcasting program exists.

2. An automatic channel searching method as claimed in claim 1, wherein the broadcasting program information comprises data decoded from a Korean Broadcasting Program System Signal included in the input channel broadcasting signal.

3. An automatic channel searching method as claimed in claim 1, further comprising the steps of:

repeating performing the broadcasting program information detecting step and the broadcasting program determining step for a predetermined time period; and displaying the searched channel broadcasting signal on the sub-channel region of the display screen for a predetermined time if it is determined that the newly starting broadcasting program exists.

4. An automatic channel searching method as claimed in claim 1, further comprising the steps of:
   repeatedly performing the broadcasting program information detecting step for a predetermined time period; and
   increasing the channel of the sub-channel broadcasting signal each time when the predetermined time period elapses, and performing channel search with respect to the a following channel broadcasting signal.

5. An automatic channel searching method for a picture-in-picture type television receiver, comprising the steps of;
   detecting broadcasting program information from an input channel broadcasting signal, and identifying the present time and an end time of the present broadcasting program being displayed on a main-channel region of a display screen;
   determining whether or not the identified present time reaches in a predetermined time before the present broadcasting program is completed; and
   searching other channel broadcasting signals in turn and displaying the searched channel broadcasting signal on a sub-channel region of the display region if it is determined that the present time reaches in the predetermined time.

6. An automatic channel searching method as claimed in claim 1, wherein the broadcasting program information comprises data decoded from a Korean Broadcasting Program System signal included in the input channel broadcasting signal.

7. An automatic channel searching method for a picture-in-picture type television receiver, comprising the steps of:
   detecting broadcasting program information from an input channel broadcasting signal, and identifying the present time and a start time of a following broadcasting program to be displayed on a main-channel region of a display screen;
   determining whether or not the identified present time reaches in a predetermined time before the following broadcasting program starts; and
   searching other channel broadcasting signals in turn and displaying the searched channel broadcasting signal on a sub-channel region of the display region if it is determined that the present time reaches in the predetermined time.

8. An automatic channel searching method as claimed in claim 7, wherein the broadcasting program information comprises data decoded from a Korean Broadcasting Program System signal included in the input broadcasting signal.

* * * * *